United States Patent [19]

Sheng

[11] Patent Number: 4,644,554
[45] Date of Patent: Feb. 17, 1987

[54] CAPILLARY BORE SUSPENSION

[75] Inventor: Shinan-Chur Sheng, Sunnyvale, Calif.

[73] Assignee: Spectra-Physics, Inc., San Jose, Calif.

[21] Appl. No.: 857,226

[22] Filed: Apr. 29, 1986

Related U.S. Application Data

[63] Continuation of Ser. No. 560,722, Dec. 12, 1983.

[51] Int. Cl.$^4$ ................................................. H01S 3/03
[52] U.S. Cl. ........................................ 372/61; 372/65;
 372/107; 372/34
[58] Field of Search ...................... 372/61, 86, 88, 55,
 372/92, 34, 107, 98

[56] References Cited

U.S. PATENT DOCUMENTS

| | | | |
|---|---|---|---|
| 3,553,604 | 1/1971 | Andress et al. | 372/34 |
| 3,753,149 | 8/1973 | Kindl et al. | 372/34 |
| 4,081,762 | 3/1978 | Golser et al. | 372/88 |
| 4,203,080 | 5/1980 | Wright et al. | 372/107 |
| 4,238,743 | 12/1980 | Golser et al. | 372/61 |
| 4,365,335 | 12/1982 | Lamboo | 372/61 |

FOREIGN PATENT DOCUMENTS 0063875 4/1982 Japan ...................................... 372/55

Primary Examiner—Leon Scott, Jr
Attorney, Agent, or Firm—Donald C. Feix

[57] ABSTRACT

A capillary bore laser tube is constructed to have little or no power loss when subjected to relatively high shock loads during operation. A spider structure supports the free end of the capillary bore tube in an almost rigid manner against transverse movement of the free end with respect to the outer envelope or jacket of the laser tube so that high shock loads and vibration produce little or no permanent change in the radial alignment of the free end of the bore tube with respect to the other operating components of the laser tube. The spider structure is a disk shaped member which is rigidly attached at its outer periphery to the outer envelope and which is also rigidly attached at its inner periphery to the bore tube. The spider structure is sufficiently flexible in a longitudinal direction to accommodate differential thermal expansion resulting from the differences in temperatures between the bore tube and the outer envelope produced when the laser is energized for operation.

4 Claims, 4 Drawing Figures

CAPILLARY BORE SUSPENSION

RELATED APPLICATION

This application is a continuation of application Ser. No. 560,722 filed Dec. 12, 1983.

BACKGROUND OF THE INVENTION

This invention relates to a laser of the kind in which a capillary bore confines the discharge within the cavity.

This invention relates particularly to a spider structure for preventing transverse movement of the free end of the bore with respect to the outer envelope or jacket while permitting longitudinal movement resulting from the differential thermal expansion of the bore with respect to the envelope which occurs during laser operation.

Gas lasers, such as helium-neon gas lasers, use a capillary bore for confining the discharge to maximize the power output.

In the coaxial design of such lasers an outer envelope or jacket surrounds the cavity, the anode and cathode are located at opposite the ends of the outer envelope, end mirrors are mounted on the ends of the envelope, and the capillary bore tube is mounted within the outer envelope and in alignment with the end mirrors. One end of the capillary bore tube is connected to the end of the outer envelope so as to be fixed in position. The other end of the bore is called the free end and projects within the cavity toward the end of the envelope opposite that to which fixed end of the bore is attached.

The bore tube is heated (by the operation of the laser) to a substantially higher temperature than the temperature reached by the outer envelope. Since the bore tube is subjected to a higher temperature than the outer envelope (as the laser is energized from a non-operating condition to an operating condition), the length of the bore tube increases at a greater rate than the length of the outer envelope. The free end of the bore tube must therefore be permitted to shift longitudinally with respect to the outer envelope to accommodate this difference in thermal expansion.

The laser light in this kind of laser has a Gaussian profile. The profile is symmetric about the central axis. While the Gaussian profile distributes far away from the central axis, the profile drops off rather sharply with distance from the central axis for the laser modes produced in tuned lasers of this kind.

The nominal design with lasers of this kind is to have the internal diameter of the bore in a range of three to four times larger than the laser mode size w, which is the 3 dB point on the Gaussian intensity profile (so that the bore will produce a maximum enhancement of the power output while still providing enough leeway to accommodate tolerances that must be accepted in fabricating laser tubes of this kind). It is not practical to make the bore size much larger than this three to four times mode size range, because the capability of the laser is not fully utilized with such larger bores.

Using bores in this size range does, however, make it quite critical that the free end of the bore be maintained in proper radial alignment within the laser, because if the free end of the bore shifts transversely by even minute amounts, say ½ mil (0.001 inch) with conventional, existing helium neon lasers, that little amount of transverse or radial shifting is enough to change the power by five to ten percent, or more, depending upon the design of the laser.

The loss in power results from a chopping off of part of the Gaussian distribution of the light when the free end of the bore shifts transversely within the cavity.

The longer the tube is, the more prominent the problem is.

Transverse shifting of the free end of the bore can, in many instances, cause a permanent change in power output. For example, if the laser is dropped of otherwise jarred, the shock load can cause a substantial and permanent change in the power output if the free end of the bore is not adequately supported against transverse movement.

In the prior art a flexible, spring-type spider construction has been used to support the free end of the bore. The flexible, spring-type spider used in the prior art extended between and engaged the inside surface of the outer envelope and the outside surface of the bore to position the free end transversely within the cavity. The flexible, spring-type spider was not rigidly attached to the envelope and the bore, but instead permitted the free end of the bore to slide within the flexible, spring-type spider for accommodating the required longitudinal movement of the free end resulting from the differential thermal expansion as noted above.

The problem with the flexible, spring-type spider support of the prior art was that it did not provide a sufficiently rigid support in the transverse direction. Relatively high shock loads and/or relatively high vibration could (as a result of cocking of the spring-type suspension or for other reasons) cause a permanent change in the transverse position of the free end within the cavity such that the power output of the laser would be reduced by an unacceptable amount.

SUMMARY OF THE PRESENT INVENTION

It is a primary object of the present invention to support the free end of the capillary bore tube in a way that overcomes the problems of the prior art.

It is a related object of the present invention to support the free end of the bore in an almost rigid manner against transverse movement of the free end with respect to the envelope (to thereby hold the free end in radial alignment within the envelope even when the laser tube is subjected to relatively high shock loads) while permitting sufficient longitudinal movement of the free end with respect to the outer envelope to accommodate the differential thermal expansion of the bore with respect to the envelope occuring during laser operation.

In one specific embodiment of the present invention the free end of the bore is supported by a spider structure having an outer periphery rigidly attached to the inside of the envelope and having an inner periphery rigidly attached to the outside of the bore tube. The spider structure includes spokes which extend radially inwardly from the outer periphery. These spokes (in combination with the rigid attachments of the spider structure to the envelope and the bore) function substantially as a solid support in a transverse direction.

The spider structure is sufficiently flexible in a longitudinal direction to permit the differential thermal expansion which occurs between the bore and the envelope during the changeover between operation and non operation of the laser.

In a specific embodiment of the present invention the spider structure is a metal member which is attached to the envelope and to the bore by glass frit. The metal is selected to have a coefficient of thermal expansion closely matched to the glass and glass frit which is used. This avoids problems of cracks which could otherwise occur from the heating and cooling of these areas during construction and operation of the laser.

Laser apparatus and methods which incorporate the structure and techniques described above and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTIONS OF THE DRAWINGS

FIG. 1 is a side elevation view in cross section of a laser incorporating a spider structure for supporting the free end of the capillary bore and constructed in accordance with one embodiment of the present invention. In FIG. 1 a part of the cathode has been partly broken away and a part of the free end of the capillary bore has been partly broken away to show details of the location of the inner end of the capillary bore within the cavity.

FIG. 2 is an elevation view taken along the line and in the direction indicated by the arrows 2—2 in FIG. 1. FIG. 2 shows details of the construction of a spider structure constructed in accordance with one embodiment of the present invention. FIG. 2 also shows the rigid attachment of the outer and inner peripheries of the spider structure to the respective inner surface of the envelope and the outer surface of the bore.

DESCRIPTION OF THE PREFERRED EMBODIMENTS

Figure 1:
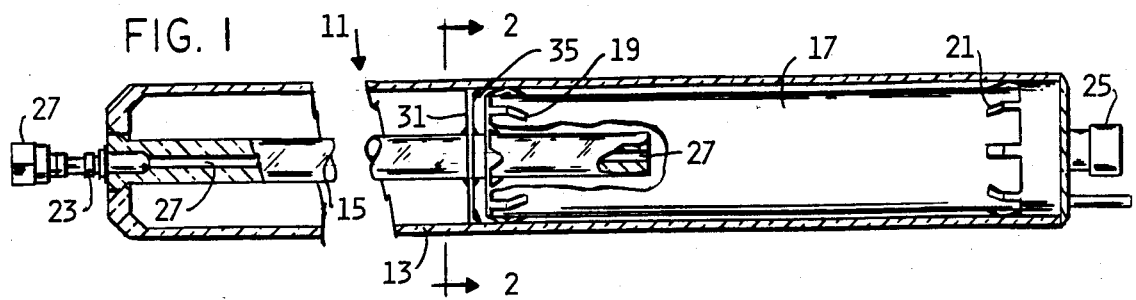

One embodiment of a capillary bore laser tube constructed in accordance with the present invention is indicated generally by the reference numeral 11 in FIG. 1.

The laser 11, as illustrated, is a helium neon gas laser of the coaxial type and has an outer envelope or jacket 13 and a capillary bore tube 15. Both the outer envelope 13 and the bore tube 15 are glass in the particular laser tube embodiment illustrated in FIG. 1.

A cathode 17 is mounted in position within the cavity inside the envelope 13 at one end of the laser tube 11. The cathode 17 is held in place by a front cathode spider 19 and a back cathode spider 21.

The spiders 19 and 20 are flexible, spring-type spiders having a plurality of curved finger members which are located at spaced intervals around the circumference of the cathode and which are curved as illustrated to engage both the inner surface of the envelope 13 and the outer surface of the cathode 17 to hold the cathode in place within the cavity of the laser tube.

An anode is mounted at the opposite end of the laser tube 11 by an anode and mirror mount 23.

Laser mirrors 25 and 27 are mounted at the opposite ends of the laser tube 11.

The capillary bore tube 15 has an inner bore 27. The diameter of this inner bore 27 is only about three to four times larger than the laser mode size so as to provide the desired confinement of the discharge for obtaining a maximum power output of the laser tube 11. The bore 27 is aligned with the laser end mirrors 25 and 27.

One end of the bore tube 15 is rigidly attached to the envelope 13 so that this end of the bore tube 15 is fixed.

The other, free end portion of the bore tube 15 projects within the cavity toward the opposite end mirror 25.

In FIG. 1 the cathode 17 has been partially broken away to show how this free end portion of the bore tube 15 extends partially within the axial length of the cathode 17.

This free end portion of the bore tube 15 must be permitted to move longitudinally to a certain extent with respect to the outer envelope 13; because, in the course of operating the laser tube 11, the discharge within the bore 27 heats the bore tube 15 to a relatively high temperature compared to the temperature existing in the outer envelope 13 (which is exposed to and cooled by the ambient atmosphere). The higher temperature of the bore tube 15 causes the bore tube 15 to undergo a larger amount of thermal expansion than the thermal expansion which occurs in the envelope 13. Since the fixed end of the bore tube is connected directly to the envelope 13, the free end of the bore tube 15 must therefore be permitted to shift longitudinally with respect to the outer envelope 13.

In the prior art a flexible, spring-type spider construction (generally similar to the spiders 19 and 21) was used to support the free end of the bore tube 15. This prior art, flexible, spring-type spider construction was not rigidly attached to the envelope and the bore tube, but instead permitted the free end of the bore to slide within the flexible, spring-type spider. This slip fit arrangement permitted the required longitudinal movement of the free end resulting from the differential thermal expansion described above.

The problem with the flexible, spring-type spider support of the prior art was that it did not provide a sufficiently rigid support of the bore tube free end in the transverse direction. Relatively high shock loads and/or relatively high vibration could produce a cocking of the spring-type suspension and could result in a permanent change in the transverse position of the free end within the cavity. This in turn could cause the power output of the laser to be reduced by an unacceptable amount. With bore internal diameter in the range of only three to four times greater the mode size, and with the relatively long laser tubes 11 used for obtaining increased power output, a shift of the free end of the bore tube transversely by even a minute amount could result in chopping off a significant part of the Gaussian distribution of light in the modes for which the laser was tuned to operate.

In accordance with the present invention the free end portion of the bore tube 15 is supported in a substantially rigid manner against transverse movement of the free end with respect to the envelope while permitting sufficient longitudinal movement of the free end with respect to the outer envelope to accommodate the differential thermal expansion of the bore tube with respect to the envelope occuring during laser operation.

This support is accomplished by a spider structure 31.

The spider structure 31 is a disk shaped member which is rigidly attached at its outer periphery to the interior surface of the envelope 13 and which is rigidly attached at its inner periphery to the outer surface of the bore tube 15.

Figure 2:
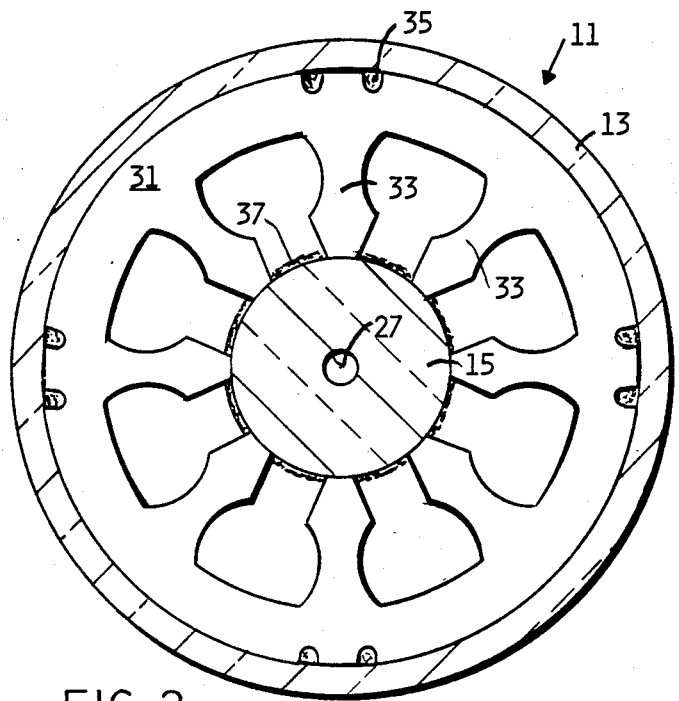

As best illustrated in FIG. 2 the spider structure 31 has a number of radially extending spokes 33 which extend inwardly from the outer periphery of the spider member and which have inner edges curved to engage the cylindrical outer surface of the bore tube 15.

In the particular embodiment illustrated in the drawings, the spider member 31 is rigidly attached to the envelope 13 by a glass frit 35, and the inner ends of the spokes 33 are rigidly attached to the bore tube 15 by a glass frit 37. Other joining techniques can be used. For example, epoxy can be used, flame sealing can be used and radio frequency heating can be used to make the rigid attachment between the spider member 31 and the envelope 13 and bore tube 15.

The rigid attachment of the spider member 31 to the envelope 13 and the bore tube 15 in combination with the disklike structure provided by the spokes 33 function substantially as a solid support in a transverse direction. The laser tube 11 can therefore absorb a relatively high shock load without transverse shifting of the free end of the bore tube 15 that would cause a permanent change in power output.

In a specific embodiment of the present invention the spider member 31 is a stamped, metal member having sufficient longitudinal flexibility to permit the spokes 31 to flex enough longitudinally to accommodate the required differential thermal expansion between the bore tube 15 and the envelope 13 and resulting longitudinal shifting of the free end portion of the bore tube 15 as described above. In this specific embodiment the spider member 31 is made from a type 42-6 sheet metal having a thickness of 10 to 20 mils (a thickness of 0.01 inch to 0.02 inch). This metal also has a coefficient of thermal expansion closely matched to the glass and glass frit used in the laser tube 11 to avoid potential problems of cracks occuring in the areas of rigid attachment of the spider member 31 to the bore tube 15 and the outer envelope 13.

Laser tubes constructed in accordance with this embodiment of the invention have exhibited sufficient transverse rigidity to enable the laser to withstand up to 100 G's of shock loading with less than a five percent permanent change in power output.

Figure 4:
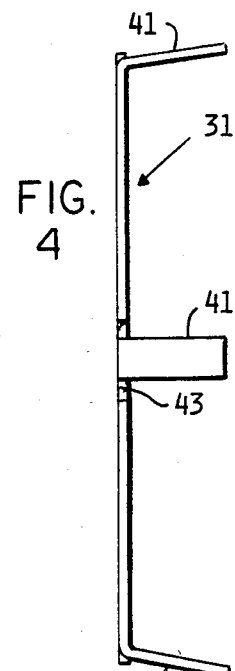
FIG. 4 is a side elevation view taken along the line and in the direction indicated by the arrows 4—4 in FIG. 3.
Figure 3:
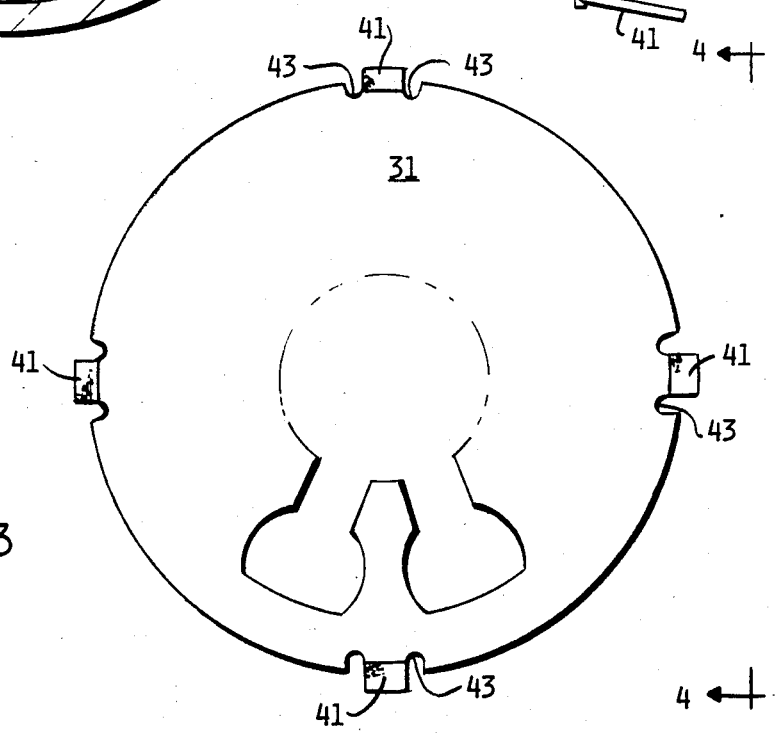
FIG. 3 is an end elevation view of the spider structure by itself (as it exists prior to being installed in the laser shown in FIGS. 1 and 2).

FIGS. 3 and 4 show the spider member 31 incorporated in the laser 11 shown in FIGS. 1 and 2. As illustrated in FIGS. 3 and 4 the spider member 31 has a plurality of tabs or fingers 41 spaced at intervals about the outer periphery. The fingers 41 are bent back but are preferably left flared outwardly at a slight angle as illustrated to facilitate initial assembly of the spider member within the outer envelope 13.

A curved recess 43 may preferably be formed on each side of a finger member 41 to facilitate a locking in of a solder glass 35 within the recess between the spider member 31 and the inner surface of the outer envelope 13 (as best illustrated in FIG. 2).

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A capillary bore laser tube of the kind in which an outer generally cylindrically shaped envelope has an anode at one end and a cathode at the other end and a cavity within the outer envelope and wherein a capillary bore tube is positioned in the cavity for confining the discharge within the bore tube and has a fixed end attached rigidly to one end of the envelope and has a projecting end projecting into the cavity toward the other end of the envelope, and wherein the improvement comprises, mounting means for supporting the projecting end of the bore in a substantially rigid manner against transverse movement of the projecting end with respect to the envelope and effective to hold the projecting end in radial alignment within the envelope even when the laser tube is subjected to relatively high shock loads while permitting sufficient longitudinal movement of the projecting end with respect to the outer envelope to accommodate differential thermal expansion of the bore tube with respect to the envelope resulting from difference in temperatures between the bore tube and an outer envelope when the laser tube is energized for operation, said mounting means comprising a spoked structure having an outer periphery rigidly and immovably attached to the inside of the envelope by glass frit, an inner periphery rigidly and immovably attached to the outside of the bore tube by glass frit, and a plurality of spokes which extend radially from said outer periphery to said inner periphery, said spokes being rigid in a transverse direction but having sufficient bending flexibility to allow the spokes to bend enough longitudinally to accommodate the required differential thermal expansion between the bore tube and the envelope and the resulting longitudinal shifting of the projecting end of the bore tube, whereby the capillary bore tube is supported substantially rigidly so that the laser tube has little or no power loss when subjected to relatively high shock loads during operation.

2. The invention defined in claim 1 wherein the laser tube is a helium neon laser tube, the outer envelope is a glass tube, the bore tube is glass, and the spoked structure is formed from a metal having a coefficient of thermal expansion closely matched to the coefficient of expansion of the glass and the glass frit used.

3. The invention defined in claim 1 wherein the internal diameter of the bore is in the range of three to four times larger than the laser mode size w, which is the 3 dB point on the Gaussian intensity profile.

4. The invention defined in claim 1 wherein the spoked structure has sufficient transverse rigidity to enable the laser to withstand up to 100 Gs of shock loading with less than a five percent permanent change in power output.

* * * * *